United States Patent
Sinha et al.

(10) Patent No.: US 9,612,935 B2
(45) Date of Patent: Apr. 4, 2017

(54) ENHANCED RESILIENCY TESTING BY ENABLING STATE LEVEL CONTROL FOR REQUEST

(71) Applicant: VMWARE, INC., Palo Alto, CA (US)

(72) Inventors: Vineet Kumar Sinha, Bangalore (IN); Prasenjit Sarkar, Bangalore (IN); Sree Ranga Sudha T K, Bangalore (IN); Prashant Kumar, Bangalore (IN); Anoop Shukla, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 132 days.

(21) Appl. No.: 14/611,289

(22) Filed: Feb. 2, 2015

(65) Prior Publication Data

US 2016/0147636 A1 May 26, 2016

(30) Foreign Application Priority Data

Nov. 21, 2014 (IN) .......................... 5855/CHE/2014

(51) Int. Cl.
*G06F 11/36* (2006.01)
*G06F 9/455* (2006.01)

(52) U.S. Cl.
CPC .......... *G06F 11/3612* (2013.01); *G06F 9/455* (2013.01); *G06F 11/3664* (2013.01)

(58) Field of Classification Search
CPC ... G06F 11/3612; G06F 11/3664; G06F 9/455
See application file for complete search history.

(56) References Cited

U.S. PATENT DOCUMENTS

| 2011/0289487 A1* | 11/2011 | Song | G06F 11/3624 717/130 |
| 2012/0151268 A1* | 6/2012 | Dearing | G06F 11/3632 714/38.1 |
| 2014/0101640 A1* | 4/2014 | Romdhane | G06F 11/3684 717/125 |
| 2015/0143179 A1* | 5/2015 | Desai | G06F 11/3688 714/38.1 |
| 2015/0161025 A1* | 6/2015 | Baset | G06F 11/3612 714/38.1 |

\* cited by examiner

*Primary Examiner* — Yolanda L Wilson

(57) ABSTRACT

A computer implemented method for testing the resiliency of a software application. The computer implemented method can test the resiliency of a software application by monitoring the program state of the software application and trigger a shutdown request when the specified program state has been reached. The shutdown request can be transmitted to the application software and executed to shut down one or more functionalities of the software application. In some examples, the method can specify the functionality to shut down and the program state which the shutdown occurs can be specified in an application configuration file.

20 Claims, 4 Drawing Sheets

ENHANCED RESILIENCY TESTING BY ENABLING STATE LEVEL CONTROL FOR REQUEST

RELATED APPLICATIONS

Benefit is claimed under 35 U.S.C. 119(a)-(d) to Foreign application Serial No. 5855/CHE/2014 filed in India entitled "ENHANCED RESILIENCY TESTING BY ENABLING STATE LEVEL CONTROL FOR REQUEST", on Nov. 21, 2014, by VMware, Inc., which is herein incorporated in its entirety by reference for all purposes.

BACKGROUND

In today's fast paced business environment, software is expected to perform reliably and thus be able to withstand various types of failures. As a result, resiliency testing is often used to verify the quality of software. In resiliency testing, a tester can test the quality of the software by purposely causing failures in the software to see how the software handles or recovers from the failures.

Typically, the software can include multiple software nodes that are each capable of processing incoming application requests. The application request can guide the software application through a set of program states. During resiliency testing, a tester can cause failures to a software node while an application request is being processed to see how the software handles the failure. While cause failures in software nodes can provide feedback on how the software handles failures, the timing in which the software nodes are brought down can greatly affect the results collected. This is due to the fact that the manner in which the software recovers depends on the program state when the software node fails. As a result, the results collected from the testing are inconclusive, which can be frustrating to the tester.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Techniques are described for testing the resiliency of a software application. The resiliency testing can include techniques for controlling the program state the software application is in when the failure is triggered. The program states can be associated with blocks of code, lines of code, or methods within the software application. By controlling the program state when the failure is triggered, a tester can more precisely test the software application, thus leading to improved reliability testing. Techniques are also described for specifying the type of failure that the software application experiences and/or the amount of time that passes before the software application attempts to resume a pending application request that had failed.

Figure 1:
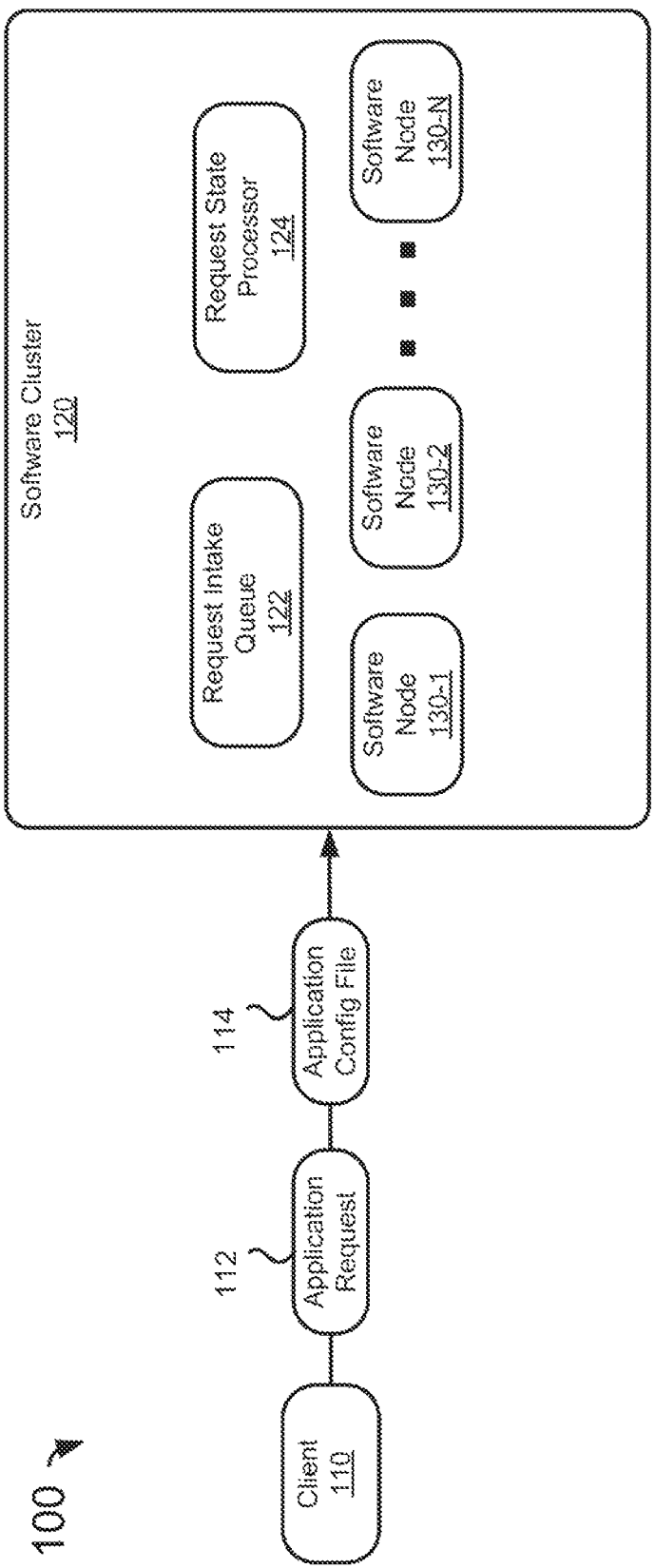
FIG. 1 depicts a resiliency testing environment according to one embodiment.

FIG. 1 depicts a resiliency testing environment according to one embodiment. Testing environment 100 includes client 110 and software cluster 120. Software cluster 120 is a collection of one or more computers that are in communication with one another. Software cluster 120 includes request intake queue 122, request state processor 124, and software nodes 130-1 to 130-N, each of which can be implemented within a computer of software cluster 120. Request intake queue 122 can be configured to receive application requests (e.g., application request 112) and place the application requests within a container such as a queue. Each application request can be provided by a client (e.g., client 110) and include one or more instructions to be executed by a software node belonging to software cluster 120. In some examples, a tester can utilize client 120 to generate software application tests in the form of application requests to test the functionality of a software node or software cluster 120. For resiliency testing, the tester can also specify a program state of the software application to trigger a failure. Request intake queue 122 can monitor the availability of software nodes 130-1 to 130-N and assign an application request from the queue to a software node when the software node is ready to handle an application request. Software nodes 130-1 to 130-N can be configured to execute an instance of a software application. Each software node can be busy when it is processing an application request. Once an application request can been completed, the software node can become available for receiving and processing another application request.

In some examples, request intake queue 122 can receive an application configuration file (e.g., application config file 114) along with an application request. The application configuration file can include settings to configure an application instance before the application instance handles the corresponding application request. For example, the application configuration file can specify the system resources to make available to the application instance, whether options such as resiliency testing should be active, and parameters that accompany the selected options (such as which program states or what functionality to cause failures during resiliency testing). In some embodiments, multiple clients can submit application requests (and optionally application configuration files along with the application requests) to request intake queue 122, which in turn assigns the application requests (and application configuration files) to software nodes.

Request state processor 124 can be configured to monitor the execution of the software instances in software nodes 130-1 to 130-N during resiliency testing. In one embodiment, request state processor 124 can monitor the program state of the software instances. Each software instance, as it executes the application request, can change its state. Exemplary program states for creating a virtual machine (VM) include cloning a template, configuring network settings, configure CPU/disk settings, and configure the guest operating system (OS). When the execution reaches a predefined program state that is specified in application config file 114, request state processor 124 can initiate a shutdown request which causes a failure to the application instance. In one embodiment, a failure to the application instance can be powering down the application instance. In another embodiment, a failure of the application instance can be losing functionality such as network connectivity or disk storage accessibility. In some embodiments, the predefined program state can be specified in application config file 114. Advantages of controlling the program state in which the failures arise in the application instance can improve resiliency testing since the tester is allowed to cause failures to the application instance at desired program states. For example, the tester can generate different tests that cause failures to the application at various states to ensure that the application is capable of handling shutdown (i.e., failures) at each state gracefully.

Here, request intake queue 122 receives application request 112 and application config file 114 from client 110. Request intake queue 122 can monitor software nodes 130-1 to 130-N for an available software node. When a software node becomes available, request intake queue 122 can assign application request 112 (along with application config file 114) to the software node. The software node can configure the application instance according to application config file 114. If application config file 114 has resiliency testing option active, then the software node can notify request state processor 124 to monitor the execution of the application instance corresponding to the software node for the predefined program state. In some examples, the software node can also notify request state processor 124 of the desired functionality to be shut down in the application Request state processor 124 in turn can monitor the software node for the predefined program state. Once the predefined program state is reached, request state processor 124 can initiate a shutdown request to shut down the application instance. Shutting down the application instance can include disabling one or more functionalities of the application instance. For example, the network connection can be disabled, connectivity to the CPU can be disabled, etc. In one example, the shutdown request is executed by software cluster 120. In other examples, the shutdown request is executed by the software node.

Figure 2:
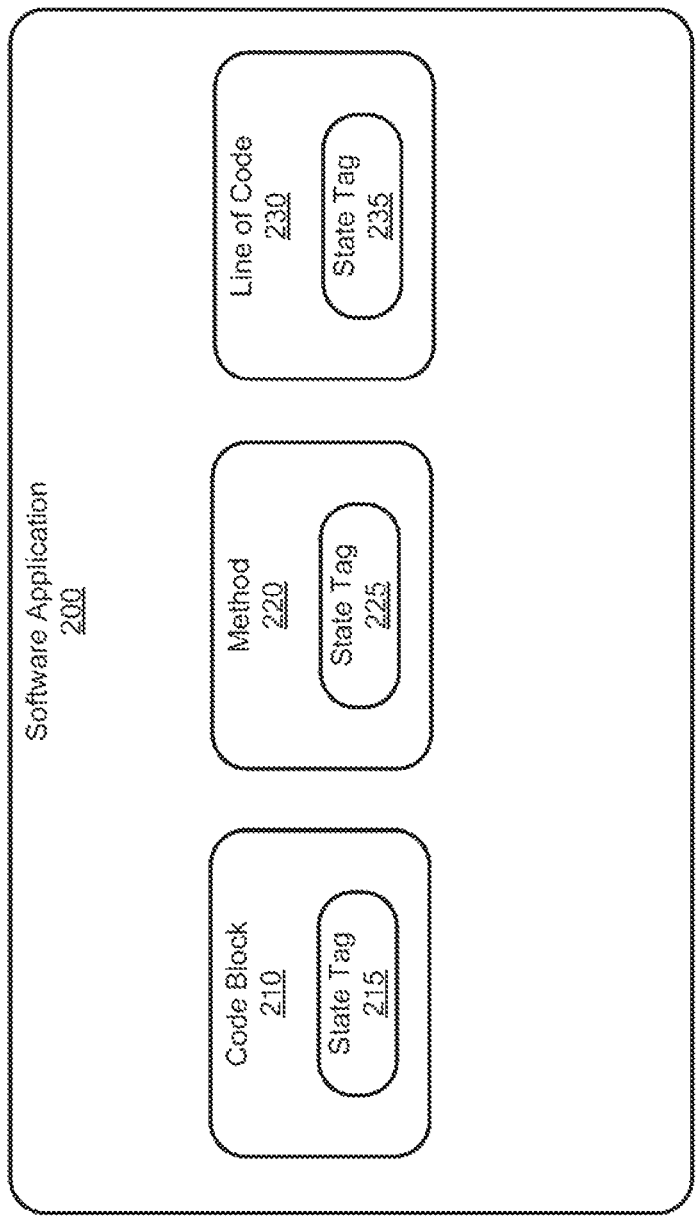
FIG. 2 depicts a software application according to one embodiment.

In some embodiments, the software application can include tags associated with portions of the software code so that request state processor 124 can monitor the execution of the software application. FIG. 2 depicts a software application according to one embodiment. As shown, software application 200 can include code block 210, method 220, and line of code 230. Each portion of software application 200 can include a tag which in turn can be monitored by request state processor 124. Here, code block 210 includes state tag 215, method 220 includes state tag 225, and line of code 230 includes state tag 235. In one embodiment, the state tag can appear in the software code directly in front of the tagged object (e.g., code block, method, line of code). An example of a tag is shown below along with a shell of the method cloneTemplate:

```
@STATE(name="CLONE-TEMPLATE")
Public void cloneTemplate (String vmName, Template template) {
....
....
}
```

As shown, the state tag @STATE(name="CLONE-TEMPLATE") appears directly above the method cloneTemplate which is being tagged. The state tag defines a program state called CLONE-TEMPLATE and associates the program state with the method cloneTemplate. As a result, the program state of software application 200 becomes CLONE-TEMPLATE whenever the method cloneTemplate is called. A state tag can be applied in a similar fashion above a code block or a line of code. In one example, developers of software application 200 can associate portions of software application 200 to desired program states and notify testers of software application 200 of the available program states. The tester can in turn test the functionality of the software application at the program states by specifying the program states as shutdown points in the application configuration file. Advantages controlling the shutdown point is the ability to precisely control when the software application is shut down. As a result, the tester can check how the software application handles the same failure when the application fails at different program states. If an application does not gracefully fail at a given program state but fails gracefully at all other program states, then the tester can notify the developer of the issue. The developer can in turn troubleshoot the given program state.

Figure 3:
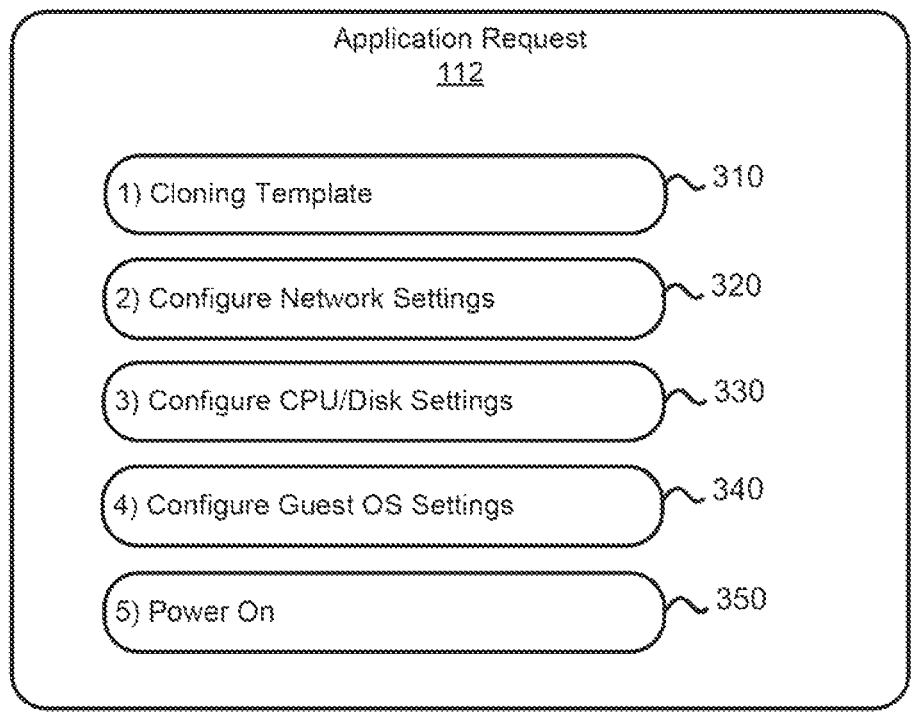
FIG. 3 depicts an exemplary application request according to one embodiment.

FIG. 3 depicts an exemplary application request according to one embodiment. Application request 112 includes instructions which guide the software application through multiple states to create a new Virtual Machine (VM). Here, application request 112 includes instruction 310 to clone a template, instruction 320 to configure network settings, instruction 330 to configure CPU/disk settings, instruction 340 to configure guest OS settings, and instruction 350 to power on the VM. Each instruction can be associated with one or more methods, code blocks, or lines of code. Execution of the method, code block, or line of code can cause the application instance to enter a different program state. As described above, some methods, code blocks, or lines of code within the software application can be tagged with program states such that the software application enters a program state when the tagged code is executed. For example, instruction 310 can be associated with the clone Template method described above. Upon executing the clone Template method, the application instance can enter the CONFIGURE-NETWORK program state. In some examples, the program state can be associated with functionality that is available after execution of the software code. For instance, the network connection can be available once the network settings have been configured through execution of instruction 320. Similarly, the CPU/Disk can be available after once CPU/Disk settings have been configured through execution of instruction 330.

Figure 4:
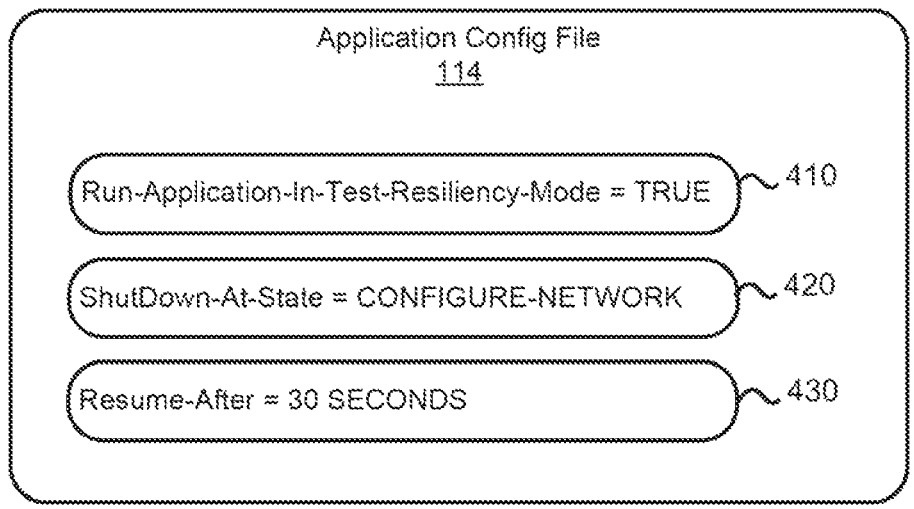
FIG. 4 depicts an exemplary application configuration file according to one embodiment.

FIG. 4 depicts an exemplary application configuration file according to one embodiment. Application config file 114 can include a plurality of instructions. Each instruction can configure a parameter of the application. A software node can process application config file 114 to configure the application instance before processing the corresponding application request. Here, instruction 410 can configure a field to run the application in test resiliency mode to TRUE. This can cause the software node to transmit a notification to request state processor 124 to monitor the program state of the software node. This allows request state processor 124 to transmit a shutdown request at a specified program state.

Instruction 420 can configure a field to that specifies when the shutdown request should be provided. Here, the field is populated with the CONFIGURE-NETWORK program state. In some embodiments, application config file 114 can also specify the manner in which the application instance is shut down. For instance, application config file 114 can specify that the application instance, VM, network, or storage connection is shut down at the specified program state. In one example where the tester wishes to shut down the network when the program state of the application instance is at CONFIGURE-GUEST-OS, then instruction 420 may read "ShutDown-Network-At-State=CONFIGURE-GUEST-OS." Alternatively if the tester wishes to shut down the storage connection when the program state of the application is at CONFIGURE-GUEST-OS, then instruction 420 may read "ShutDown-Storage-Connection-At-State=CONFIGURE-GUEST-OS." A software node can process instruction 420 and transmit a notification to request state processor 124 of the program state in which the shutdown request should be transmitted. In some examples where the type of functionality to shut down has been specified, the software node can also transmit these details to request state processor 124. Request state processor 124 in turn can transmit a shutdown request that corresponds with the type of functionality when the specified program state has been reached.

Instruction 430 can configure a field to specify a wait time before resuming the functionality that was previously shut down (i.e., resume period). Here, instruction 430 has specified that the application instance should resume after a period of 30 seconds. A software node processing application config file 114 can transmit a notification to request state processor 124 of the resume period. Request state processor 124 can transmit a resume request that corresponds with the functionality that was previously shut down after the specified period of time has passed. In other embodiments, additional instructions can be provided to further configure the application instance.

Figure 5:
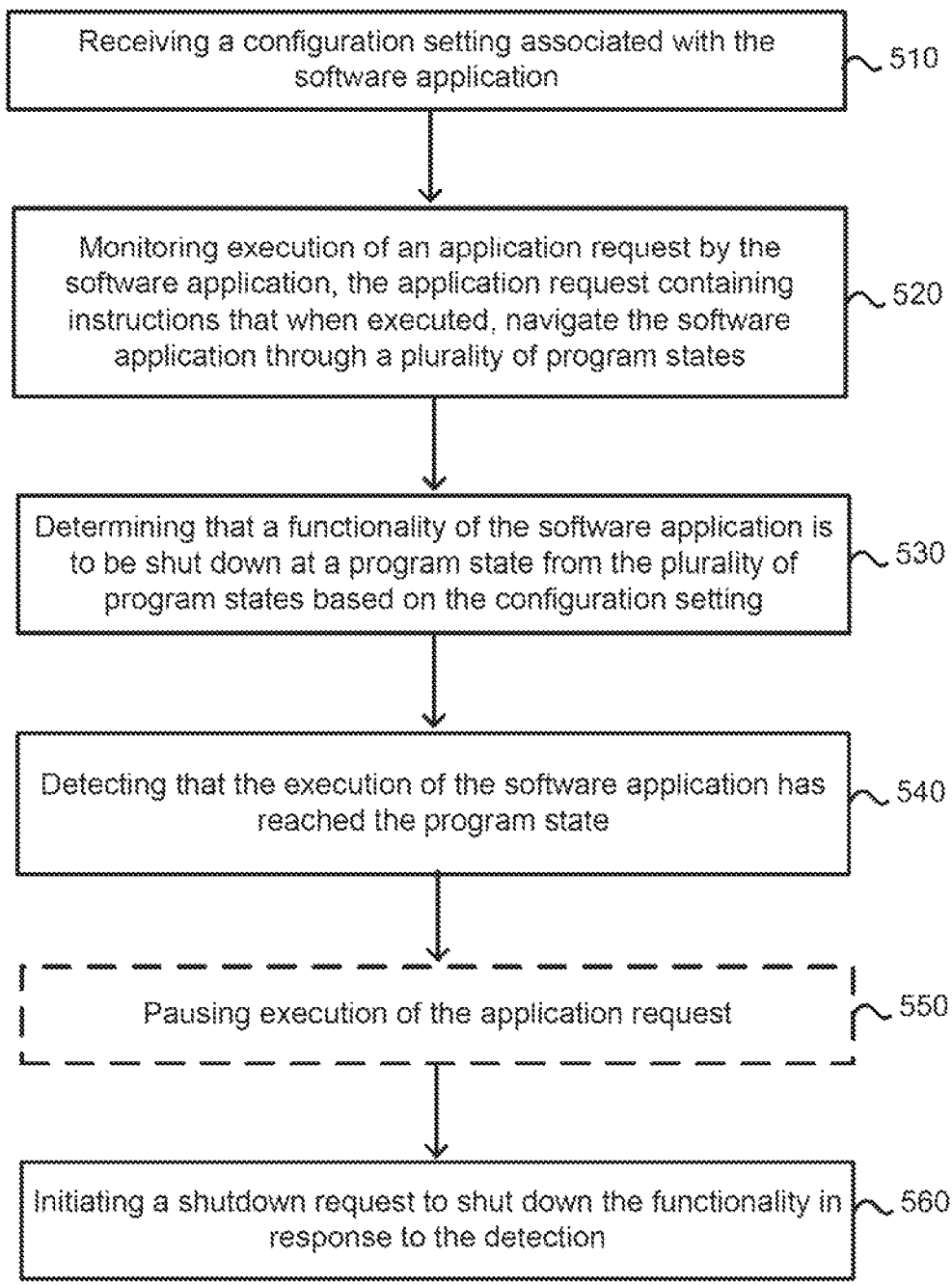
FIG. 5 depicts a process for cause failures to an application instance according to one embodiment.

FIG. 5 depicts a process for shutting down an application instance according to one embodiment. Process 500 can be stored in computer readable code and executed by a processor. For example, process 500 can be part of the computer readable code that is executed by request state processor 124 of FIG. 1. Process 500 can begin by receiving a configuration setting associated with the software application. The software application can be an application instance that is executing on a software node and the configuration setting can originate from an application configuration file. In one example, the software application processes the application configuration file and transmits the configuration setting that is being received. After receiving the configuration setting, process 500 can continue by monitoring the execution of an application request by the software application at 520. The application request can contain instructions that when executed, navigate the software application through a plurality of program states. In one example, request state processor 124 can monitor the status of a program state field associated with the application instance. The application instance can update the program state field as the program state changes during the execution of the software application.

Process 500 can determine that a functionality of the software application is to be shut down at a program state from the plurality of program states based on the configuration setting at 530. In one embodiment, the configuration setting can specify a program state in which the application instance is to be shut down. Process 500 then continues by detecting that the execution of the software application has reached the program state at 540. In one example, the process can monitor the program state field of the application instance and detect that the specified program state has been reached. Upon detecting that the program state has been reached, process 500 can optionally pause the execution of the application request. In one example, request state processor 124 can transmit a request to the application instance to pause execution of the application request. Process 500 can also initiate a shutdown request to shut down the functionality in response to the detection. In one example, request state processor 124 can transmit the shutdown request to the application instance for execution. The application instance can process the shutdown request, resulting in shutting down the functionality. In some embodiments, process 500 can transmit a resume request to resume the functionality after a specified wait time. The application instance can process the resume request to resume the functionality.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A computer-implemented method for testing the resiliency of a software application, comprising:
   receiving, by a processor, a configuration setting associated with the software application;
   monitoring, by the processor, execution of an application request by the software application, the application request containing instructions that when executed, navigate the software application through a plurality of program states;
   determining, by the processor, that a functionality of the software application is to be shut down at a program state from the plurality of program states based on the configuration setting;
   detecting, by the processor, that the execution of the software application has reached the program state;
   pausing, by the processor, execution of the application request; and
   initiating, by the processor, a shutdown request to shut down the functionality in response to the detection.

2. The computer-implemented method of claim 1, further comprising:
   receiving, by the processor, another configuration setting associated with the application;
   identifying, by the processor and based on the another configuration setting, a resume-after period specifying a period of time after which the functionality of the software application is to resume; and
   initiating, by the processor, a resume request to restore the functionality when the period of time has passed after shutting down the functionality.

3. The computer-implemented method of claim 1, wherein the program state is associated with at least one code block in the software application.

4. The computer-implemented method of claim 1, wherein the functionality was created through one of the plurality of program states.

5. The computer-implemented method of claim 1, wherein the program state is one of cloning a template, configuring a network setting, configuring a CPU setting, configuring a guest Operating System setting, and powering on a VM.

6. The computer-implemented method of claim 1, further comprising resuming, by the processor, execution of the application request.

7. The computer-implemented method of claim 1, further comprising monitoring, by the processor, a result generated from the shutdown request.

8. One or more non-transitory computer readable storage devices containing instructions, that when executed, control a computer system to be configured for:
   receiving a configuration setting associated with the software application;
   monitoring execution of an application request by the software application, the application request containing instructions that when executed, navigate the software application through a plurality of program states;
   determining that a functionality of the software application is to be shut down at a program state from the plurality of program states based on the configuration setting;
   detecting that the execution of the software application has reached the program state;
   pausing execution of the application request; and
   initiating a shutdown request to shut down the functionality in response to the detection.

9. The one or more non-transitory computer readable storage devices of claim 8, further comprising:
   receiving another configuration setting associated with the application;
   identifying, based on the another configuration setting, a resume-after period specifying a period of time after which the functionality of the software application is to resume; and
   initiating a resume request to restore the functionality when the period of time has passed after shutting down the functionality.

10. The one or more non-transitory computer readable storage devices of claim 8, wherein the program state is associated with at least one code block in the software application.

11. The one or more non-transitory computer readable storage devices of claim 8, wherein the functionality was created through one of the plurality of program states.

12. The one or more non-transitory computer readable storage devices of claim 8, wherein the program state is one of cloning a template, configuring a network setting, configuring a CPU setting, configuring a guest Operating System setting, and powering on a VM.

13. The one or more non-transitory computer readable storage devices of claim 8, further comprising resuming execution of the application request.

14. The one or more non-transitory computer readable storage devices of claim 8, further comprising monitoring a result generated from the shutdown request.

15. An apparatus, comprising:
   one or more computer processors; and
   one or more non-transitory computer-readable storage devices comprising instructions, that when executed, control the one or more computer processors to be configured for:
   receiving a configuration setting associated with the software application;
   monitoring execution of an application request by the software application, the application request containing instructions that when executed, navigate the software application through a plurality of program states;
   determining that a functionality of the software application is to be shut down at a program state from the plurality of program states based on the configuration setting;
   detecting that the execution of the software application has reached the program state;
   pausing execution of the application request; and initiating a shutdown request to shut down the functionality in response to the detection.

16. The apparatus of claim 15, further comprising:
receiving another configuration setting associated with the application;
identifying, based on the another configuration setting, a resume-after period specifying a period of time after which the functionality of the software application is to resume; and
initiating a resume request to restore the functionality when the period of time has passed after shutting down the functionality.

17. The apparatus of claim 15, wherein the program state is associated with at least one code block in the software application.

18. The apparatus of claim 15, wherein the functionality was created through one of the plurality of program states.

19. The apparatus of claim 15, wherein the program state is one of cloning a template, configuring a network setting, configuring a CPU setting, configuring a guest Operating System setting, and powering on a VM.

20. The apparatus of claim 15, further comprising resuming execution of the application request.

* * * * *